United States Patent [19]
Gray

[11] Patent Number: 5,533,718
[45] Date of Patent: Jul. 9, 1996

[54] WORKPIECE HOLDER

[76] Inventor: Stephen B. Gray, 1115 19th St. #10, Santa Monica, Calif. 90403

[21] Appl. No.: 418,856

[22] Filed: Apr. 7, 1995

Related U.S. Application Data

[63] Continuation of Ser. No. 72,978, Jun. 4, 1993, abandoned.

[51] Int. Cl.$^6$ ..................................................... B23Q 3/00
[52] U.S. Cl. ............................................................. 269/296
[58] Field of Search ............................. 248/74.3, 230.8, 248/229.17, 172; 24/16 PB:30.5 PB; 2/311–322, 337–340; 269/296, 88

[56] References Cited

U.S. PATENT DOCUMENTS

| | | | |
|---|---|---|---|
| 1,589,677 | 6/1926 | Bisch | 2/311 |
| 2,082,346 | 6/1937 | Lavenson | 2/312 |
| 2,136,796 | 11/1938 | Krantz | 2/339 |
| 2,354,404 | 7/1944 | Sayles | 248/74.3 |
| 2,417,245 | 3/1947 | Eggert et al. | 248/74.3 |
| 4,780,935 | 11/1988 | Palombit | 24/16 PB |
| 5,214,874 | 6/1993 | Faulkner | 24/16 PB |
| 5,289,619 | 3/1994 | Pileggi | 24/17 AP |

*Primary Examiner*—Robert C. Watson

[57] ABSTRACT

A workpiece to be cleaned or otherwise operated upon, for example a musical cymbal, is supported by a holder having the form of a belt. The belt's lower edge rests on a work surface. Its upper edge supports the workpiece rim, holding the workpiece off the work surface. In use, the belt is constrained to lie in a closed curve by means which removably fasten its outer end to an intermediate place along its length. The belt's perimeter length is adjustable to accomodate workpieces of widely varying sizes. To prevent unwanted movement of the workpiece with respect to the belt, or of the belt with respect to the work surface, the belt is given friction means, which can be bands or strips of rubber, either running lengthwise along the belt or wrapped around it.

6 Claims, 1 Drawing Sheet

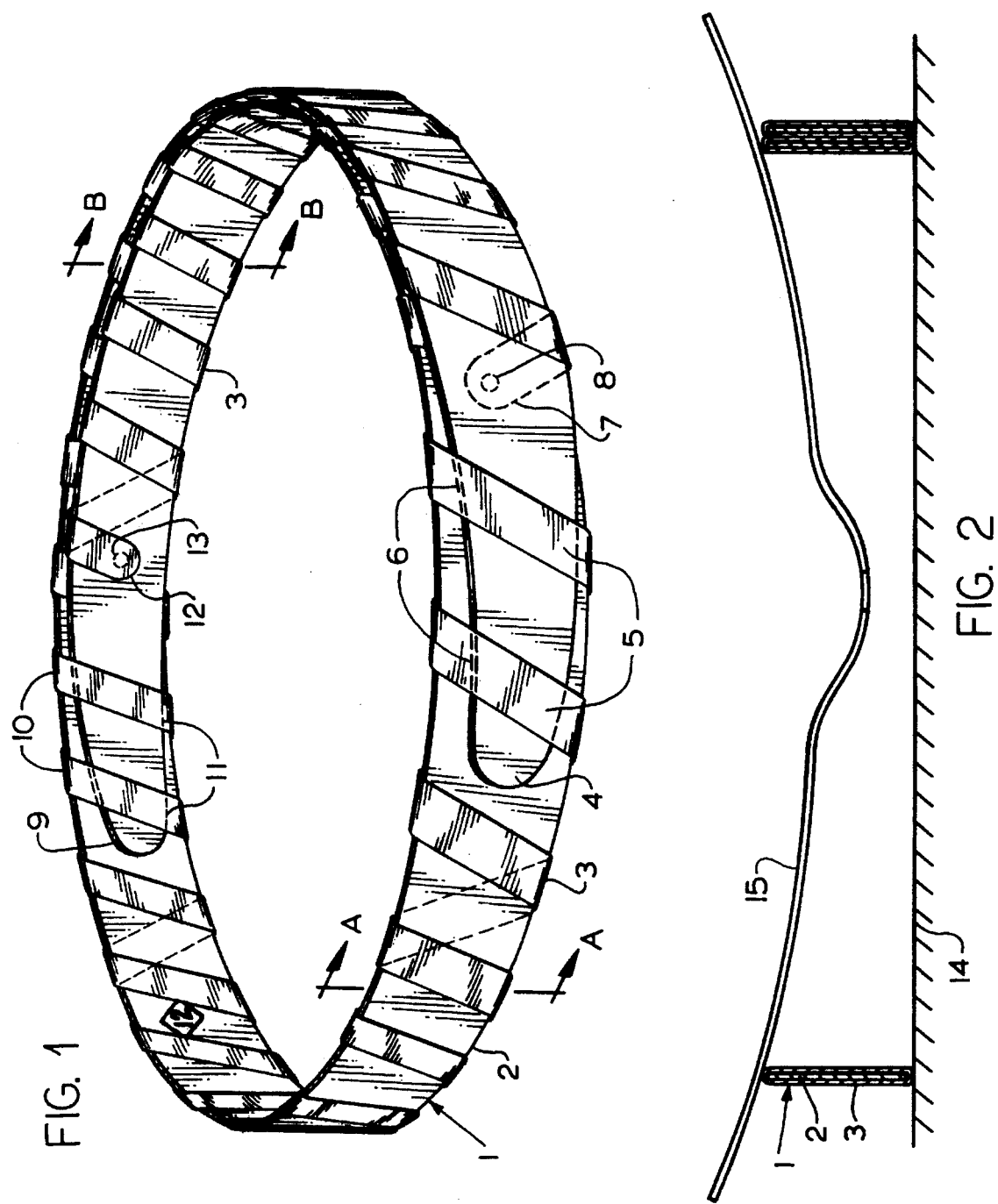

WORKPIECE HOLDER

CROSS REFERENCE

This is a continuation of my prior patent application, Ser. No. 08/072,978 filed Jun. 4, 1993 now abandoned.

FIELD OF INVENTION

The present invention relates to the field of supporting workpieces while they are being cleaned or otherwise worked on. More specifically, it relates to holders or supports for round or oval, plane or mildly convex/concave disks such as musical cymbals, plates, or trays.

SUMMARY OF INVENTION

This invention is a belt-like device which supports workpieces under their perimeter and out of contact with a working surface. It has a range of adjustability allowing support of workpieces over a perimeter range of 4:1 or more.

BACKGROUND OF INVENTION

Musical cymbals are only one of the types of workpieces for which the present invention is useful, but will be used to illustrate the invention's features.

In normal handling, cymbals are exposed to chemicals present on peoples' hands, and other forms of dirt. Brass does not rust but is subject to staining and mild corrosion, which affects the appearance of the cymbals, and can even affect their sound. The chemicals naturally present on peoples' hands, if left on a cymbal for more than a few days, can cause staining or etching which is difficult to remove. Also, over time, deep stains and marks of unknown origin appear.

There are commercial metal polishes and cleaning compounds available, as well as compounds meant specifically for cymbals. They generally incorporate a mild abrasive as well as a chemical cleaning agent. These polishes and cleaners are used with a cloth, and must be rubbed vigorously. Done properly, this process effectively removes superficial dirt and finger stains. However, removing long-standing fingerprints and deep stains requires heavier abrasive cleaning, undesirable because some metal is removed, which can affect the sound.

Ideally, cymbals would be cleaned regularly. This task is frequently neglected in spite of the fact that it becomes harder as it is delayed. One reason is that cleaning cymbals heretofore has been an unpleasant operation, for several reasons, as follows.

First, considerable pressure and rubbing are required, especially when removing embedded dirt or etched-in stains. This rubbing is fatiguing.

Second, while doing this cleaning, the cymbals tend to slide around and are hard to hold conveniently, especially when cleaning the concave side. The cymbal's movement is in the direction of the rubbing motion, and forces the rubbing motion to extend farther, adding to fatigue. In addition, when the cymbal is resting with its convex side down on a typical working surface such as a table or floor, it will rock back and forth, making it difficult to apply sufficient force to clean thoroughly.

Third, there is some danger of losing control of the cymbal while rubbing it, which could result in its falling off a table. A cymbal which gets badly dented is regarded as useless.

Fourth, when cleaning the convex side, the rim of the cymbal rests on the working surface. When cleaning near the rim of the cymbal, it is difficult to avoid contacting the adjacent working surface, which then tends to get stained with the cleaning residue. This residue is a smelly black substance which is unwelcome on any table or floor.

Fifth, access to the very edge of the cymbal is difficult because it is in contact with the working surface. The edge would best cleaned by wrapping the cleaning cloth around the edge and rubbing both sides of the edge simultaneously.

What is needed to improve the cleaning operation is a device that holds the cymbal still while it is being cleaned. If cleaning were thereby made more efficient, it would be done more regularly, improving the appearance and life of the instruments. Further, if the cymbal is held firmly, a deeper cleaning becomes feasible, allowing reconditioning of cymbals which might otherwise be discarded.

These same factors apply when working on other round or oval objects such as plates, trays, dishes, and shallow bowls, made of copper, silver, or other materials needing regular care. Thus cymbals are only one example of a workpiece needing to be held during cleaning or other work.

The following properties would be desirable in a device for securing such workpieces. This device is hereinafter called the 'holder', which in operation rests on a 'working surface'.

1. The holder should secure non-planar workpieces equally well with either the convex or concave side facing up.
2. With either side facing up, the holder should keep the rim of the workpiece off the working surface. This allows the edge of the workpiece to be cleaned thoroughly, and would keep cleaning residue from getting on the working surface.
3. The holder should discourage movement of the workpiece with respect to the working surface, while resisting sideways force and torque resulting from the cleaning action.
4. The holder should secure the workpiece well enough so that the operator's other hand does not always have to help hold it down, thus freeing that hand.
5. The holder should be adaptable to workpieces of widely different sizes; in the case of musical cymbals, it should accommodate a diameter range of at least 6 to 22 inches.
6. The holder's working diameter must be adjustable quickly and easily so that a set of workpieces of different sizes can be accommodated efficiently.
7. The holder's working diameter preferably could be calibrated with easily read numbers, so the user can immediately set it for a workpiece of known size without trial and error.
8. The holder should allow cleaning the entire workpiece, from the rim to the center.
9. The holder should not 'capture' the workpiece as a clamping mechanism might, but preferably would simply support it, so that flipping the workpiece over to clean the other side, and changing from one workpiece to the next, are quick actions.
10. Use of the holder should present negligible danger of damaging the workpiece. This discourages using clamping mechanisms which can be accidentally over-tightened.
11. Preferably, the holder would be so simple that its advantages and method of use are self-evident to a potential or actual user.

12. The holder should be equally usable by right- and left-handed persons.
13. The holder should be compactible so that it can be stored in a small space.
14. The holder should be rugged, long-lasting, light, and inexpensive.

DESCRIPTION OF DRAWINGS

FIG. 1 shows the workpiece holder. The figure shows the holder curved into a circle or oval of intermediate diameter.

FIG. 2 is a cross-section of the holder, taken through the section lines marked 'A' and 'B' in FIG. 1. In the figure, the holder is supporting a cymbal with its convex side down, also shown in cross-section.

LIST OF REFERENCE NUMERALS

1 - workpiece holder
2 - strip piece
3 - typical turn of wrapped band
4 - outer end of strip
5 - turns of band capturing outer end of strip
6 - outer sections of strip captured by band
7 - first end of wrapped band
8 - fastening of first end of band to strip
9 - inner end of strip
10 - turns of band capturing inner end of strip
11 - inner sections of strip captured by band
12 - second end of wrapped band
13 - fastening of second end of band to strip
14 - work surface
15 - cymbal being worked on

DETAILED DESCRIPTION OF THE PREFERRED EMBODIMENT

The holder has a body piece or strip 2, in the general shape of a flat belt, which must be flexible enough to be curled into a circle or wide oval sufficiently small to support the smallest expected workpiece. In the case of a holder meant for cymbals, this smallest circle is preferably no larger than 5 inches in diameter, appropriate for supporting cymbals 6 inches in diameter, a common minimum size.

The strip must also be sufficient in total length to form a circle or oval of a much larger diameter to support workpieces of larger size. A holder designed for cymbals should accommodate a full range of cymbal sizes, which are commonly as large as 22 inches in diameter. Thus the same holder should vary over a range of more than 4:1 in diameter settings. Clearly at the smaller diameter settings there will be considerable extra strip length. At the smaller settings, the extra strip length is formed into a true spiral, tightly wound so that adjacent turns are in contact.

In contrast with its required flexibility, strip 2 must be stiff enough so that it tends to remain in an approximate circle or oval at all circumference settings from minimum to maximum. Further, the material of strip 2 must be stiff enough to resist downward force over its full height, without collapsing, when cymbal 15 or other workpiece is in place and being cleaned, as shown in FIG. 2. (Materials in a strip configuration resist edge-applied forces more strongly when the strip forms an arc, as in the present application, than when the strip is straight.)

The height of the strip body piece 2 must be sufficient to clear any downward-facing convexities of the workpiece. For cymbals, an appropriate height is two inches, which will allow their central bulge or bell to rest off the working surface.

A variety of materials have the required combination of flexibility, stiffness, and ruggedness needed for this application. One such material is ABS plastic, which can be for example about 0.062 inches thick. Other suitable plastic materials include PVC and nylon. The material selected should also resist cracking and breaking if bent too sharply, and in general resist careless handling.

If the strip is unconstrained, it will tend to straighten. When the strip is forced to curve around so that it contacts itself, as seen in FIG. 1, the natural straightness of strip body piece 2 will cause it to form a circle, which is the most relaxed shape under the given constraints. Because of the flexibility of the chosen material, it is easy to shape the strip into an wide oval as well as a circle.

The strip body piece 2 alone, with means to removably fasten it to itself so that it forms a closed curve, would serve to hold the workpiece in the desired position. However a stiff plastic material such as ABS would have low friction against both a typical workpiece made of metal, and a typical work surface material. This would allow the workpiece to slide around as it is being cleaned. To prevent this, friction means are added to the strip.

FIG. 1 shows the present invention wherein a flexible friction band 3 is wrapped in a flattened helix around the strip body 2. (The helical band 3 is not to be confused with the spiral winding of the entire strip as shown in FIG. 1 .) Center-to center spacing of the turns is somewhat arbitrary but can be approximately equal to the height of the strip, for example 2 inches. The band can be one continuous piece, which in total length can be about twice the length of the strip itself, which is typically 72 inches. Band width is also somewhat arbitrary but can be about 0.6 to 0.8 inch. Band 3 is held in tension while it is being wrapped during assembly, so it is moderately stretched, by about 20–30 percent.

Band 3 can be fastened to strip 2 by means of suitable adhesive spots at its outer end 7 and inner end 12. Strip 2 can be held in a circle or oval of any desired perimeter by tucking its ends 4 and/or 9 under turns 5 and/or 10 of band 3. The smallest increment of strip circumference would then be equal to the spacing of successive turns of band 3; however the circumference is actually adjustable over a continuous range because the strip ends 4 and/or 9 can be pulled under the bands to a variable extent.

To facilitate tucking strip ends 4 and 9 under turns of band 3, the strip ends can be tapered in width and thickness near their ends, as shown in FIG. 1.

Thus in this preferred embodiment, wrapped bands 3 serve first, to add friction to the strip's contact with both the workpiece and the working surface; second, to present a soft non-scratching surface to both workpiece and work surface; and third, to serve as a restraint for the strip's end(s), thereby holding said strip in a circle of any desired diameter.

An important property of any friction-adding means is that sideways slippage of the strip with respect to both the workpiece and working surface be minimized. With the flat helical wrapping, inherent friction between the band material and the strip material is depended on to some extent. A further factor discouraging movement is the basic geometry of a helically wound band having equal and constant pitch angles on both sides of the strip: if a section of the band moved lengthwise along the strip, the length of that section would have to increase. Therefore tension in the wrapping serves to limit movement of the wrapped band.

It will be understood that many details given in the description of the preferred embodiment can be varied without changing the principles of the invention. All dimensions given above are illustrative only, and each has a suitable range over which the principles of the present invention hold. In particular, the height and length of strip 2, the widthand thickness of band 3, and the spacing of turns of band 3 can be varied over a suitable range to fit any particular application. Further, the thickness of the material of strip body and of the friction band can be varied over a considerable range.

No principle of the present invention restricts its use to cymbals or to cleaning operations, although exemplary dimensions in the two preferred embodiments were presented for that application. An adjustable circular or oval workpiece-supporting device may have applications in other fields in which flat or dished or shallow bowl shaped workpieces, not necessarily circular, need to be supported or held still while they are being cleaned or otherwise worked on.

I claim:

1. A workpiece holder which is supported by a work surface and which in turn supports rigid, round or oval workpieces which have a range of perimeters and which are planar or have a shallow bowl shape, said workpiece holder comprising
   (a) a flexible strip whose relaxed shape is straight, said strip having a length, thickness and composition chosen to allow it to be bent into a variety of circles or ovals whose perimeters approximate said range of workpiece perimeters,
   (b) said thickness and composition further chosen so that said strip will maintain its shape while withstanding compressive forces across its width,
   (c) said strip also having an upper edge which in use is proximate to said workpiece and a lower edge which is when in use is proximate to said work surface,
   (d) said strip also having a width greater than any nonplanarity of said workpieces so that said workpieces are supported free of contact with said work surface,
   (e) said strip being wrapped with an elastic band, said band composition chosen to have high friction when in contact with a material of said workpieces, a material of said work surface, and said composition of said strip,
   (f) said band wrapping having the form of a multiple turn helix in which each turn crosses an inner flat surface of said strip, said upper edge of said strip, an outer flat surface of said strip, and said lower edge of said strip, so that in use said band is in contact with both said workpiece and said work surface, and so that said friction between said band and said workpiece will prevent unwanted motion of said workpiece, said strip, and said work surface.

2. The workpiece holder of claim 1 in which
   (a) said elastic band is wrapped around said strip while under a degree of tension such that in said surface crossings, said band is in contact with said strip surfaces,
   (b) said band having a width less than a pitch of said flat helix, thus providing a space between said turns in which at one or both ends of said strip can be inserted to lie between at least one of said turns of said flat helix and said surface of said strip, confining said end to lie in contact with an intermediate place on said strip,
   (c) so that by means of friction between said band and said strip, said strip is detachably held in a circle or oval of desired perimeter.

3. The workpiece holder of claim 1 in which said ends of said strip are tapered in width to facilitate tucking them under at least one turn of said elastic band.

4. The workpiece holder of claim 1 in which said ends of said strip are tapered in thickness to facilitate tucking them under at least one turn of said elastic band.

5. A workpiece holder which supports rigid, substantially flat round or oval workpieces such as cymbals, trays, and plates, during cleaning or other operations, said workpiece holder comprising:
   (a) a flexible support strip, or belt, of uniform width, length of said belt chosen to approximate a perimeter of said workpieces;
   (b) said belt having an upper edge which while in use is in contact with said workpiece, said contact extending around substantially all of said perimeter of said workpiece and being inboard of said perimeter so that said workpiece is supported by said belt;
   (c) said belt having a lower edge which in use is in contact with a flat working surface;
   (d) said belt having a width, between said upper edge and said lower edge, selected to allow any workpiece to be supported free of contact with said flat working surface, said width being otherwise as small as possible so that said support will be firm and free of wobble;
   (e) said belt having inner and outer surfaces which are substantially free of contact with the workpiece being supported;
   (f) said belt made of material and having thickness chosen to withstand, without substantial deformation, downward compressive forces acting from edge to edge across its width, said forces being generated by pressure exerted during said cleaning or other operations;
   (g) friction means comprising an elastic band wound around substantially the full length of said belt in a flat helix, turns of said helix alternately crossing said upper edge and said lower edge of said belt, each end of said band permanently attached to said belt, said crossings providing friction against said workpiece and working surface through surface properties of a material of said elastic band.

6. The elastic band of claim 5 further including a width chosen to be less than the center to center spacing between adjacent turns around said belt, said band held in sufficient tension so that it lies flat against faces of said belt, so that an end of said belt can be removably fastened to another section of said belt one working perimeter of said belt distant from said end, said end passing between said belt and at least one of said turns of said flat helix, said end held immovable through friction with said band and said belt, thereby preventing said belt from varying from its working perimeter.

\* \* \* \* \*